United States Patent [19]

Hamm

[11] Patent Number: 5,040,518
[45] Date of Patent: Aug. 20, 1991

[54] FUEL VAPORIZER MANIFOLD

[76] Inventor: Myrle W. Hamm, 1357 N. Bolton, Jacksonville, Tex. 75766

[21] Appl. No.: 549,475

[22] Filed: Jul. 6, 1990

[51] Int. Cl.[5] ...................... F02M 25/00; F02M 31/00
[52] U.S. Cl. .................................... 123/557; 123/568; 123/545; 123/570
[58] Field of Search ............... 123/557, 543, 545, 568, 123/570

[56] References Cited

U.S. PATENT DOCUMENTS

| | | | |
|---|---|---|---|
| 4,167,165 | 9/1979 | Finlay et al. | 123/545 |
| 4,261,316 | 4/1981 | Motosugi et al. | 123/568 |
| 4,356,806 | 11/1982 | Freesh | 123/570 |
| 4,370,970 | 2/1983 | Kunz | 123/557 |
| 4,413,605 | 11/1983 | Leoni | 123/568 |
| 4,480,622 | 11/1984 | Hoffman | 123/557 |
| 4,515,135 | 5/1985 | Glass | 123/557 |
| 4,569,322 | 2/1986 | Gristina | 123/568 |
| 4,611,567 | 9/1986 | Covey | 123/557 |

Primary Examiner—Andrew M. Dolinar
Assistant Examiner—M. Macy
Attorney, Agent, or Firm—Hawes & Fischer

[57] ABSTRACT

A fuel vaporizer manifold to be mechanically interconnected between the carburetor and intake manifold of an internal combustion engine of a motor vehicle. The vaporizer manifold comprises a plurality of parallel aligned and longitudinally extending heating tubes and a plurality of parallel aligned and laterally extending heat conducting fins that are arranged in thermal contact with said tubes. A portion the hot exhaust gases being emitted from the engine is recycled from the exhaust manifold to the carburetor by way of the heating tubes of the vaporizer manifold to thereby heat the tubes and the fins in contact therewith. Liquid fuel (e.g. gasoline), which is mixed with air and supplied to the vaporizer manifold from the carburetor, flows over the heat conducting fins, whereby said liquid fuel is vaporized. The vaporized fuel is supplied from the vaporizer manifold to the intake manifold to be efficiently combusted within the cylinders of the engine. Accordingly, the exhaust emitted into the atmosphere by the engine will be characterized by a relatively low temperature and less potentially harmful pollutants.

16 Claims, 4 Drawing Sheets

FUEL VAPORIZER MANIFOLD

BACKGROUND OF THE INVENTION

1. Field of the Invention

This invention relates to a vaporizer manifold and gas conveying system for an internal combustion engine of a motor vehicle and to a method by which said manifold is adapted to heat and thereby convert a liquid fuel into a vapor for efficiently powering the engine, whereby to maximize fuel economy and reduce the amount of harmful pollutants being exhausted into the atmosphere.

2. Background Art

It is well known, particularly in highly populated geographic areas, that air pollution is a growing source of environmental concern. One major cause of air pollution is the noxious emissions being exhausted into the atmosphere by motor vehicles. More particularly, only a portion of the raw liquid fuel (e.g. gasoline) is combusted within the cylinders of a conventional internal combustion engine. Consequently, more fuel is consumed per mile travelled, whereby fuel economy suffers. Moreover, much of the uncombusted raw fuel is burnt in the hot tailpipe of the motor vehicle. Thus, the exhaust being emitted from the vehicle into the atmosphere is characterized by a high temperature and a noxious gas content.

Devices are known in the prior art to be interconnected with an internal combustion engine in an effort to increase gas mileage and/or eliminate harmful pollutants. However, many of these devices are complex, expensive and/or require modifications to the engine.

An example of a fuel vaporizer for an internal combustion engine is available by referring to U.S. Pat. No. 4,167,165 issued Sept. 11, 1979. However, none of the exhaust gases exiting the vaporizer or the engine is recycled to the carburetor. Consequently, the effectiveness of such a vaporizer for increasing fuel mileage and reducing pollution is limited.

SUMMARY OF THE INVENTION

In general terms, a vaporizer manifold is disclosed having particular application for use in an internal combustion engine for eliminating exhaust pollution and increasing fuel mileage. The engine is of the type that is powered by a liquid fuel (e.g. gasoline) and includes a carburetor, intake and exhaust manifolds, and an air cleaner. In the preferred assembly, the vaporizer manifold is interconnected between the carburetor, for receiving a mixture of liquid fuel and air therefrom, and the intake manifold of the engine. The vaporizer manifold comprises a plurality of parallel aligned, longitudinally extending heating tubes and a plurality of parallel aligned, laterally extending heat conducting fins being in thermal contact with the heating tubes and having openings for receiving and supporting said tubes. One end of an exhaust inlet line communicates with inlet ends of the heating tubes, and the opposite end of the inlet line is connected to the exhaust manifold of the engine. One end of an exhaust outlet line communicates with outlet ends of the heating tubes, and the opposite end of said outlet line communicates with the carburetor by way of the air cleaner. An exhaust return line is connected between the exhaust manifold (at the tailpipe) and the carburetor (at the air cleaner).

In operation, a portion of the hot exhaust gases exiting the engine at the exhaust manifold is conveyed by the exhaust inlet line to the heating tubes of the vaporizer manifold. The exhaust gases pass through and heat the heating tubes, whereby to correspondingly raise the temperature of the heat conducting fins which are in thermal contact therewith. Liquid fuel (e.g. gasoline) which is mixed with air and supplied to the vaporizer manifold from the carburetor flows over and between the heat conducting fins. Accordingly, the heat is transferred from the fins to the liquid fuel to convert the liquid to a vapor. The vaporized fuel is supplied from the heat conducting fins of the vaporizer manifold to the intake manifold to be combusted in the cylinders of the engine. The exhaust gases which exit the heating tubes are conveyed by the exhaust outlet line to the air cleaner, where said gases are mixed with fresh air from the atmosphere and returned to the carburetor. The exhaust gases exiting the engine at the exhaust manifold and not being supplied to the exhaust inlet line are carried by the exhaust return line to the carburetor by way of the air cleaner housing. Cooling means (e.g. an electric fan) are located in proximity to the exhaust return line to cool the gas flowing therethrough.

Because the fuel enters the intake manifold as a vapor, rather than a liquid, virtually all of the fuel will be rapidly and efficiently combusted within the cylinders. Thus, less fuel will be needed to power the engine, such that fuel mileage is increased. Moreover, less raw fuel remains to be burnt in the tail pipe, so that the temperature of the emissions is lowered and the amount of pollution that is exhausted into the atmosphere is reduced.

DESCRIPTION OF THE PREFERRED EMBODIMENT

Figure 1:
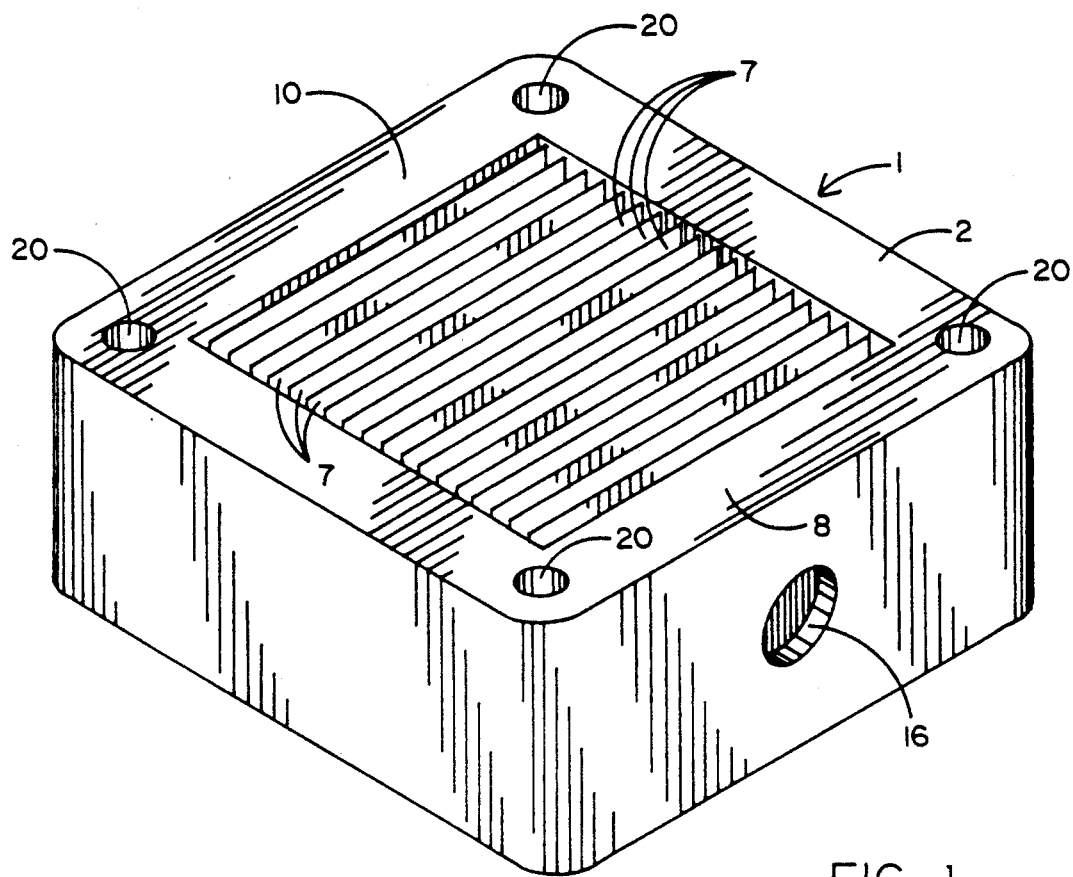
FIG. 1 is a perspective view of the fuel vaporizer manifold which forms the present invention.

The fuel vaporizer manifold 1 which forms the present invention and which is adapted to be interconnected with a conventional internal combustion engine is initially described while referring concurrently to FIGS. 1-5 of the drawings. The vaporizer manifold 1 includes a rectangular housing 2 that is fabricated from a lightweight, heat conducting material, such as aluminum, or the like. The housing 2 is provided with a hollow chamber 4 at the interior thereof. Extending longitudinally through the chamber 4 of housing 2 is a plurality of heating tubes 6. In the present embodiment, a total of seven evenly spaced heating tubes 6 extend in parallel alignment with one another through chamber 4. However, it is to be understood that the precise number of heating tubes 6 that is carried by vaporizer manifold 1 is not to be considered a limitation of the present invention.

The heating tubes 6 are supported by a plurality of generally planar and relatively thin fins 7. The fins 7 are formed from a heat conducting material, such as aluminum, or the like. Fins 7 are arranged in closely spaced, parallel alignment with one another and have holes cut therewithin by which to accommodate and support the heating tubes 6 therethrough. It is preferable that the heat conducting fins 7 extend laterally through the interior chamber 4 of housing 2 in perpendicular alignment and thermal contact with heating tubes 6. The efficiency of vaporizer manifold 1 is maximized as the total surface area of the heat conducting fins 7 increases and the spacing between adjacent fins decreases.

Figure 2:
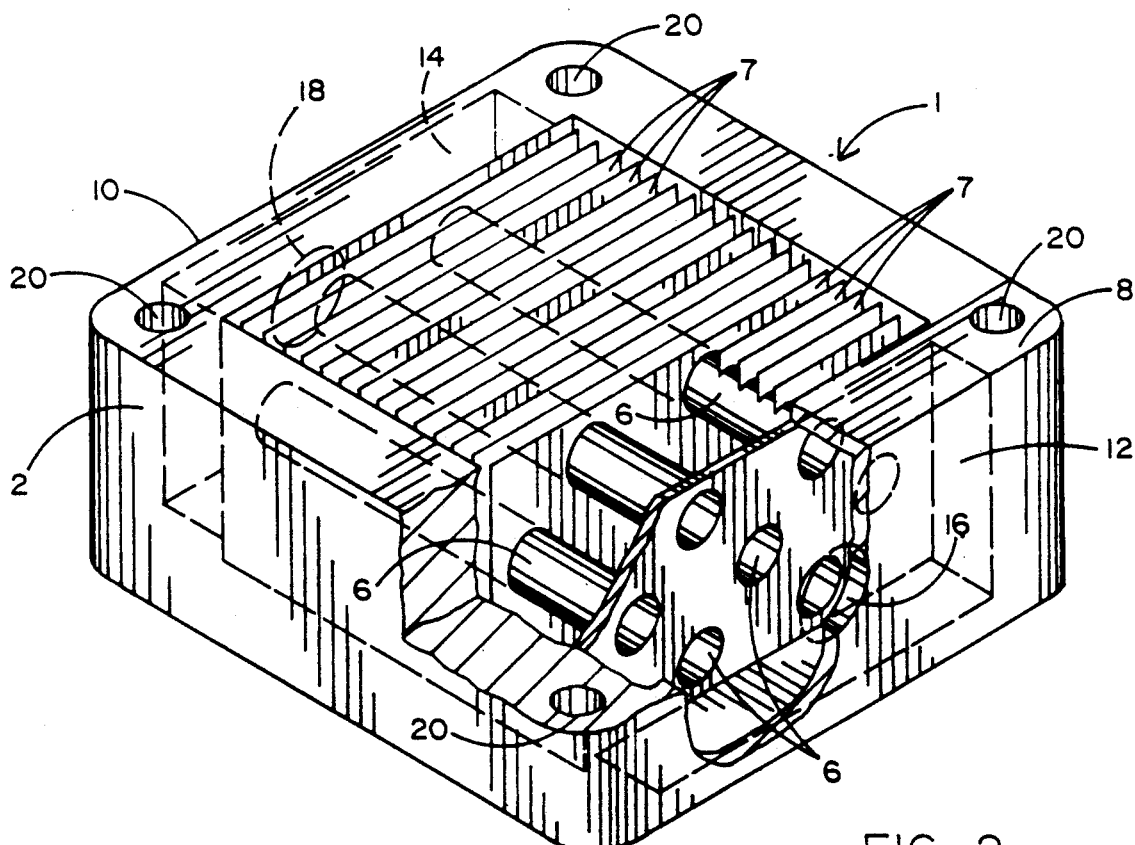
FIG. 2 is a partially broken away perspective view of the vaporizer manifold of FIG. 1.
Figure 3:
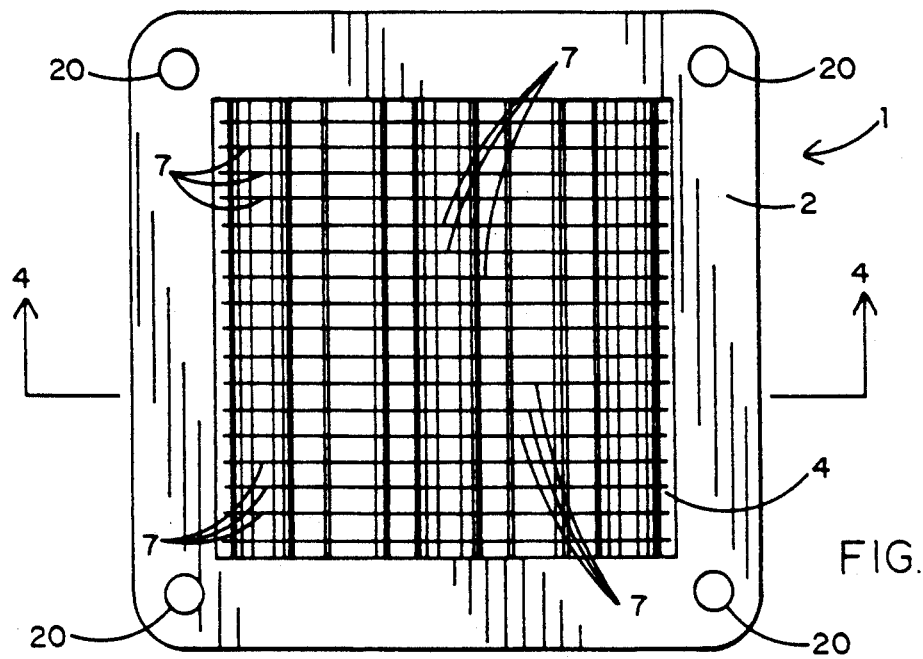
FIG. 3 is a top view of the fuel vaporizer manifold.
Figure 4:
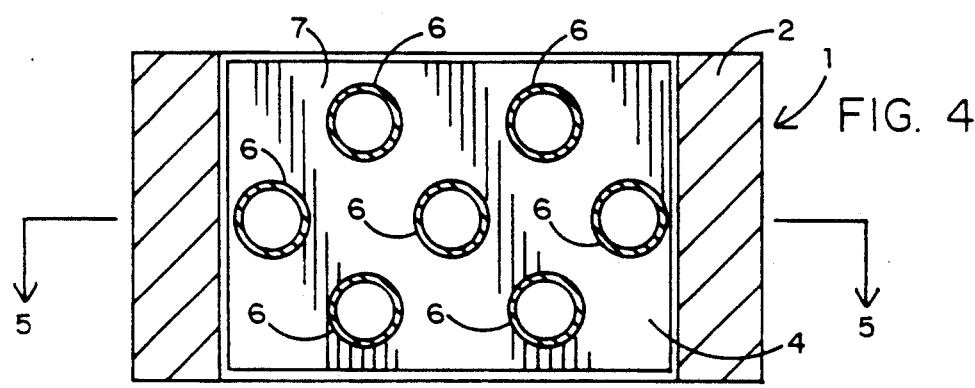
FIG. 4 is a cross-section taken along lines 4—4 of FIG. 3.
Figure 5:
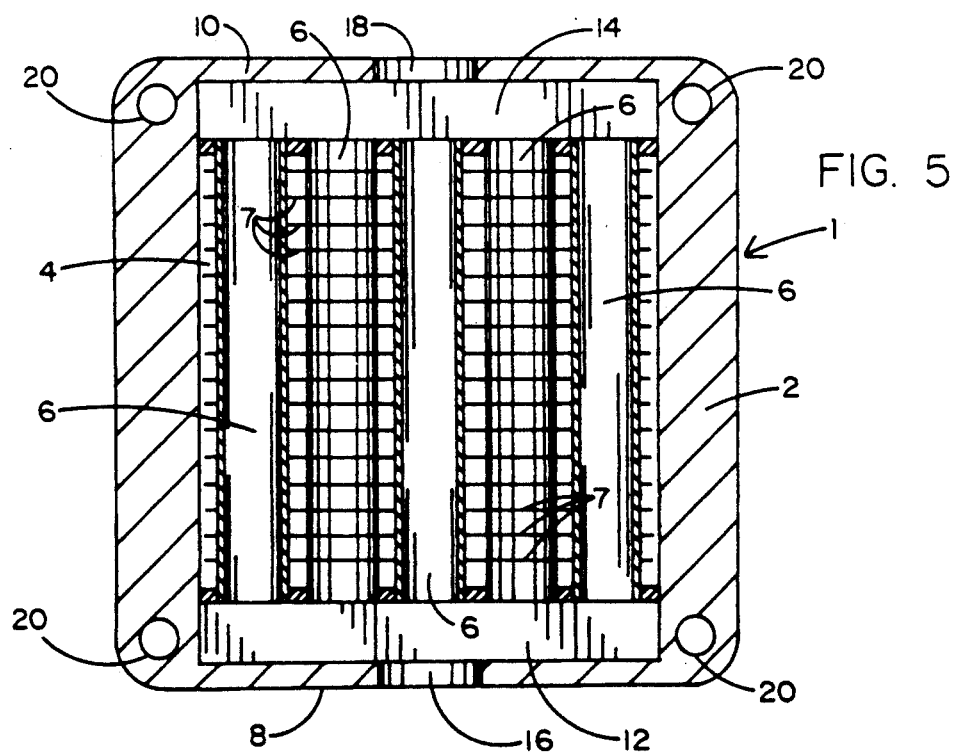
FIG. 5 is a cross-section taken along lines 5—5 of FIG. 4.

As is best shown in FIG. 2, the opposing ends of heating tubes 6 are also supported by the front and rear end walls 8 and 10 of the housing 2 of vaporizer manifold 1. Each of said front and rear end walls 8 and 10 includes a respective air space 12 and 14 formed therewithin. An inlet orifice 16 extends through the front wall 8 of housing 2. Inlet orifice 16 communicates with inlet ends of the heating tubes 6 by way of the air space 12. An outlet orifice 18 extends through the rear well 10 of housing 2. Outlet orifice 18 communicates with outlet ends of heating tube 6 by way of air space 14.

Bolt holes 20 extend through each of the corners of the housing 2 of vapor manifold 1. As will be explained in greater detail when referring to FIGS. 6 and 7, the bolt holes 20 are sized to accommodate carburetor bolts (not shown), whereby vaporizer manifold 1 can be connected to an internal combustion engine.

Figure 6:
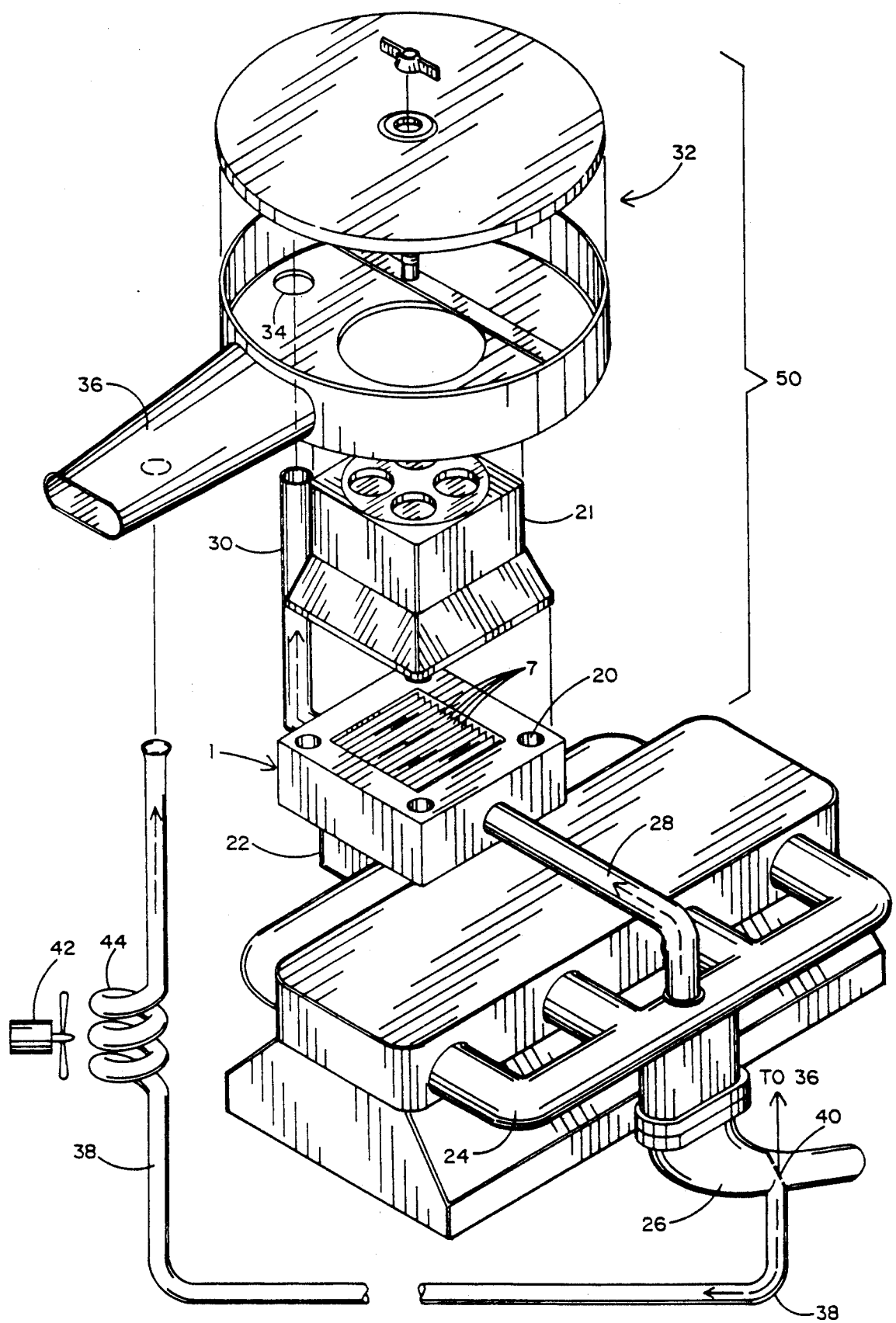
FIG. 6 is an exploded view of the fuel vaporizer manifold to be interconnected with an internal combustion engine.
Figure 7:
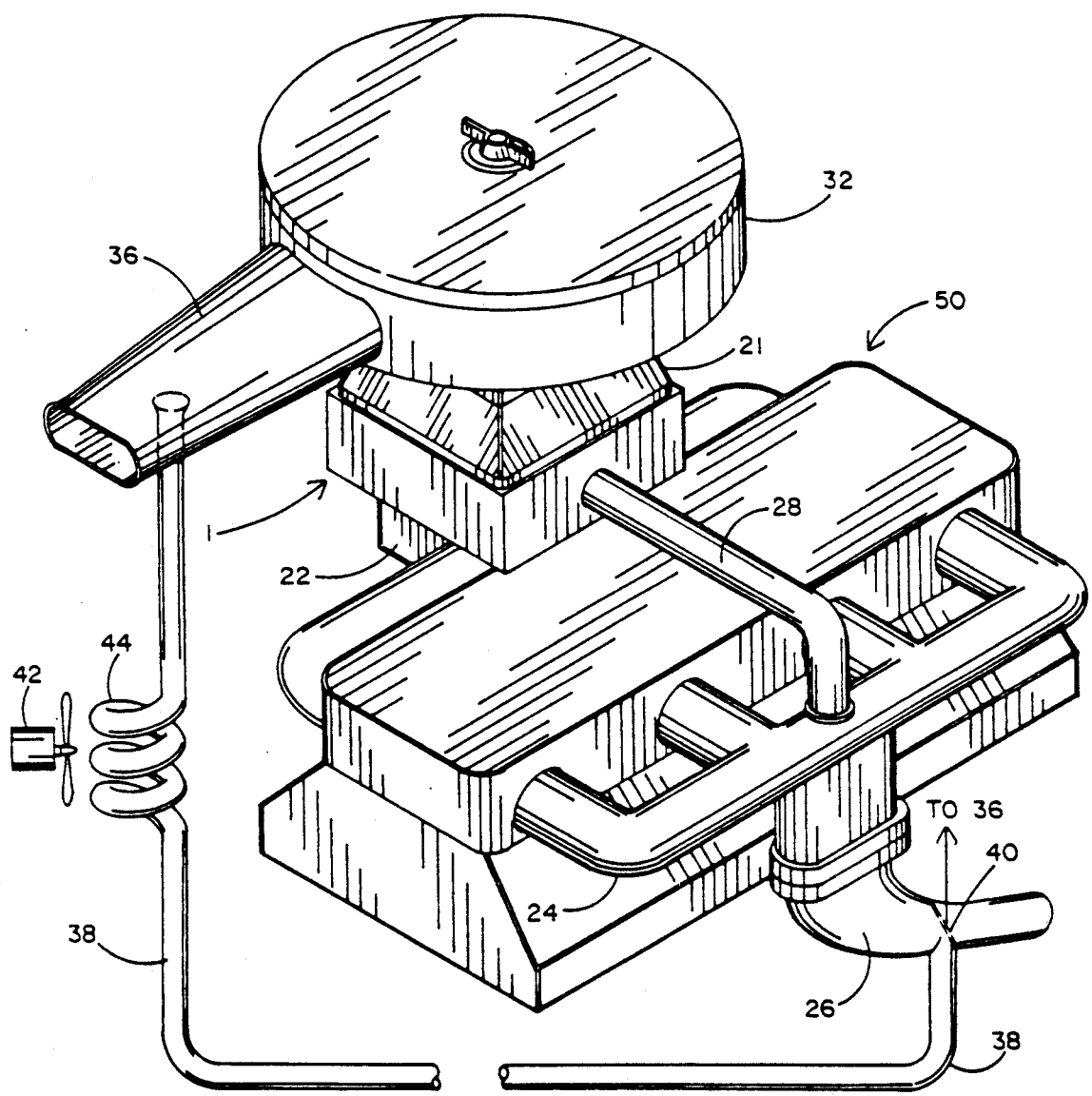
FIG. 7 shows the fuel vaporizer manifold interconnected with the internal combustion engine of FIG. 6.

To this end, FIGS. 6 and 7 of the drawings show the installation of the fuel vaporizer manifold 1 of the present invention between a conventional carburetor 21 and intake manifold 22 of an internal combustion engine 50 of a motor vehicle. The engine 50 includes (at least one) exhaust manifold 24. The exhaust manifold 24 of engine 50 is interconnected in fluid communication with an exhaust (i.e. tail) pipe 26, an exhaust inlet line 28 and an exhaust return line 38. More particularly, the exhaust inlet line 28 has a preferred length of approximately 18 to 20 inches and extends from exhaust manifold 24 to the inlet orifice (designated 16 in FIG. 2) which is formed in the front wall 8 of vaporizer manifold 1. The exhaust inlet line 28 is sized to receive a portion of the hot exhaust gases being emitted by way of the exhaust manifold 24 of engine 50 that would otherwise be delivered to the tailpipe 26.

An exhaust outlet line 30, having a preferred length of approximately 12 to 15 inches, is connected from vaporizer manifold 1 (i.e. at the outlet orifice 18 through the rear wall 10 of housing 2) to the air cleaner housing 32. That is, a hole 34 is cut into the bottom of the air cleaner housing 32 to accommodate exhaust outlet line 30 therethrough, such that said outlet line 30 will be received at the interior of a conventional air filter (not shown) that has been seated within housing 32. An air intake duct 36 communicates with the interior of air cleaner housing 32 in the usual manner.

One end of the exhaust return line 38 is shown connected to the tailpipe 26 so as to be in fluid communication with exhaust manifold 24. However, and in the alternative, exhaust return line 38 may be connected directly to exhaust manifold 24 to receive the balance of the exhaust gases that are emitted from the engine 50 but directed away from exhaust inlet line 28. The opposite end of exhaust return line 38 is connected to the air intake duct 36 of air cleaner housing 32.

A heat and pressure responsive butterfly valve 40 is located at the intersection of tailpipe 26 and exhaust return line 38. Butterfly valve 40 is coupled via a vacuum line (not shown) to the existing pressure responsive butterfly valve (also not shown) that is conventionally located within the air intake duct 36 of air cleaner housing 32, such that a displacement of the existing butterfly valve in air duct 36 causes a corresponding displacement of butterfly valve 40 in tailpipe 26. Butterfly valve 40 is normally biased to extend across tailpipe 26 so that, under relatively low temperature conditions within tailpipe 26 and low pressure conditions within intake duct 36, the balance of the exhaust from engine 50 will be redirected away from tailpipe 26 and through exhaust return line 38.

It is preferable to cool the exhaust gases being delivered from exhaust manifold 24 into the air intake duct 36 by exhaust return line 38. Therefore, an electric fan 42 may be located in proximity to return line 38 to blow cool air over a portion of the surface of said line. In addition, it may be desirable to increase the effective length of exhaust return line 38 and thereby increase the heat loss of the gases in line 38. This may be accomplished by introducing a series of turns 44 into return line 38 between the opposite ends thereof.

In the assembled relationship (of FIG. 7), the fuel vaporizer manifold is located directly below carburetor 21 and directly above intake manifold 22. By extending long bolts (not shown) from carburetor 21 through the holes 20 in housing 2, and into intake manifold 22, the vaporizer manifold 1 may be secured in flush engagement between said carburetor 21 and intake manifold 22. Moreover, exhaust outlet line 30 will communicate with the interior of air cleaner housing 32 through the hole 34 (of FIG. 6) formed in the bottom thereof, and exhaust return line 38 will communicate with the intake duct 36 of air cleaner housing 32 through a hole formed therein.

The operation of the fuel vaporizer manifold 1 and the method of the present invention for reducing noxious emissions and pollution exhausted by a motor vehicle is now described while referring concurrently to FIGS. 1-7. Initially, hot exhaust gases from engine 50 are collected in the exhaust manifold 24 to be delivered to the tailpipe 26. Typically, the exhaust gases in tailpipe 26 would have a temperature of approximately 400-600 degrees F. A portion of the hot gases in exhaust manifold 24 are redirected into the vaporizer manifold 1 by way of the exhaust inlet line 28. The temperature of the hot gases in inlet line 28 is approximately 500 degrees F.

The hot gases are conveyed by inlet line 28 through the inlet orifice 16 of vaporizer manifold 1 and into the air space 12 within the front wall 8 of manifold housing 2. The pressure created within the air space 12 causes the hot exhaust gases to flow through heating tubes 6. Accordingly, the heat of the exhaust gases is transferred from heating tubes 6 to the heat conducting fins 7. Exhaust gases flowing out of heating tubes 6 are combined at the air space 14 within the rear wall 10 of manifold housing 2. The gases are then conveyed through the outlet orifice 18 in housing 2 and into the exhaust outlet line 30, whereby such gases are delivered to the interior of an air filter that is located within air cleaner housing 32. The hot gases are then mixed with and cooled by fresh air from the atmosphere that is supplied to the interior of air cleaner housing 32 through air intake duct 36. The resulting mixture of cool air and exhaust gases are directed into the carburetor 21 from the air cleaner housing 32 in the usual fashion, such that any unburnt fuel in the exhaust gases is returned to the carburetor to be vaporized and recombusted within the cylinders of the engine via fuel vaporizer manifold 1 and intake manifold 22.

In a conventional combustion engine, liquid fuel (e.g. gasoline) and air are mixed within the carburetor and then combusted within the cylinders. However, by virtue of the present vaporizer manifold 1, a mixture of raw fuel and air will flow from carburetor 21 directly into the housing 2 of manifold 1 and, more particularly, between the heat conducting fins 7. Inasmuch as the temperature of the fins 7 is raised by the hot exhaust gases of engine 50 flowing through heating tubes 6, the liquid fuel which contacts fins 7 will be vaporized. Therefore, the liquid fuel advantageously enters the cylinders of the engine 50 through the intake manifold 22 as a vapor, rather than a liquid.

As a result of the foregoing, the exhaust emitted by engine 50 through the exhaust manifold 24 and tail pipe 26 will be relatively clean, because the gas molecules in a vapor state will be more quickly and efficiently combusted in the cylinders. That is to say, the fuel is substantially consumed in the cylinders and not in the tail pipe, as is otherwise known to occur in motor vehicles where the liquid fuel is only partially combusted in the cylinders and, therefore, exhausted into the atmosphere as a potentially harmful emission. Moreover, the temperature (approximately 180 to 250 degrees F.) of the exhaust emitted from engine 50 to the tailpipe 26 will be lower than the temperature (approximately 400 to 600 degrees F.) of the exhaust emitted from a conventional internal combustion engine without vaporizer manifold 1, since little of the fuel will be burnt in tail pipe 26. What is more, because virtually all of the vaporized fuel is combusted, rather than wasted, the fuel is more efficiently consumed, such that less fuel is needed to power engine 50, whereby mileage can be increased per gallon of fuel consumed.

So long as the temperature of the exhaust gases being emitted from engine 50 at exhaust manifold 24 remains relatively low (e.g. below 250 degrees F.), and the pressure within the air intake duct 36 of air cleaner housing 32 is low enough so as not to kill engine 50, the heat and pressure responsive butterfly valve 40 will remain closed across tailpipe 26. Therefore, any gases which are not redirected from exhaust manifold 26 into exhaust inlet line 28 are recycled through exhaust return line 38. The exhaust gases conveyed by return line 38 are cooled by means of the fan 42 and the increased length of line 38 introduced by turns 44. It is desirable that the gases being delivered to the intake duct 36 of air cleaner housing 32 by way of return line 38 have a temperature of approximately 120 to 160 degrees F. Accordingly, the recycled gases are mixed with and further cooled by fresh air that is supplied from the atmosphere into air intake duct 36. The resulting mixture of cool air and exhaust gas is directed through air cleaner housing 32 and into carburetor 21, such that any unburnt fuel in exhaust return line 38 is recycled through the carburetor to be vaporized by vaporizer manifold 1 and supplied to the cylinders of engine 50 via intake manifold 22 to be recombusted as was previously disclosed.

In the event that the temperature of the exhaust gases being emitted from engine 50 rises (e.g. above 250 degrees F.), or the pressure within air intake duct 36 approaches a level that would adversely affect the operation of engine 50, butterfly valve 40 will rotate away from its normal position across tailpipe 26 to now extend across and block the exhaust return line 38. In this case, the exhaust gases being emitted from the engine are expelled directly into the atmosphere via tailpipe 26 until the temperature and/or pressure caused by the exhaust gases changes and the butterfly valve 40 returns to its normal position.

It should be appreciated that the exhaust gases that are conveyed from exhaust manifold 24 to vaporizer manifold 1 via exhaust inlet line 28 are rerouted for the dual purpose of being recombusted to burn any unused fuel therein and for utilizing the heat content of such gases for raising the temperature of the heat conducting fins 7 and thereby changing the state of the fuel delivered by the carburetor from a liquid to a vapor. Since the fuel enters the cylinders as a vapor, a greater explosive effect is achieved therein to more rapidly drive the pistons through the cylinders and thereby increase horsepower as well as fuel mileage. Moreover, since the exhaust gases being recycled to the carburetor (at air cleaner housing 32) by way of exhaust return line 38 are of low temperature (e.g. less than 160 degrees F.), engine knock can be better avoided. In addition, and because of the efficient combustion of fuel provided by and returned to the carburetor with the exhaust gases, it is now possible to jet down the carburetor.

It will be apparent that while a preferred embodiment of the invention has been shown and described, various modifications and changes may be made without departing from the true spirit and scope of the invention.

Having thus set forth a preferred embodiment of the invention, what is claimed is:

1. For an internal combustion engine including a carburetor and intake and exhaust manifolds, a vaporizer manifold and gas conveying system for receiving liquid fuel from the carburetor and converting the liquid fuel to a vapor for powering the engine, said vaporizer manifold and gas conveying system comprising:

heating tube means having inlet and outlet ends;

heat conductive surface means being arranged in thermal contact with said heating tube means and positioned to come into contact with the liquid fuel received from the carburetor;

inlet means for receiving some of the hot exhaust gases exiting the engine, said inlet means communicating with the inlet ends of said heating tube means so that the hot gases received at said inlet means pass through said heating tube means for heating said heat conductive surface means and vaporizing the liquid fuel coming in contact therewith, said vaporized fuel being provided to the intake manifold from said vaporizer manifold;

outlet means extending between the outlet ends of said heating tube means and the carburetor to permit the hot exhaust gases exiting said vaporizer manifold to be supplied to the carburetor to be mixed with fresh air thereat; and an exhaust return line extending between the exhaust manifold and the carburetor for receiving other exhaust gases exiting the engine that are not received by said inlet means, said exhaust return line supplying said other exhaust gases to the carburetor to be mixed with fresh air thereat.

2. The invention recited in claim 1, wherein said heat conductive surface means includes at least one fin being in thermal contact and extending in perpendicular alignment with said heating tube means.

3. The invention recited in claim 1, wherein said heating tube means includes at least one tube extending longitudinally through said vaporizer manifold, and said heat conductive surface means includes at least one fin extending laterally through said vaporizer manifold and having a hole for accommodating said heating tube therethrough.

4. The invention recited in claim 1, wherein said inlet means includes an exhaust inlet line connected between the exhaust manifold and the inlet ends of said heating tube means so that some of the hot exhaust gases exiting the engine from the exhaust manifold are supplied to said heating tube means by way of said exhaust inlet line.

5. The invention recited in claim 1, wherein said outlet means includes an exhaust outlet line connected between the outlet ends of said heating tube means and the carburetor.

6. The invention recited in claim 5, wherein the engine also has an air filter housing communicating fluidically with the carburetor, said exhaust outlet line connected from the outlet ends of said heating tube means to said air filter housing so that the exhaust gases exiting said heating tube means are supplied by said outlet line to the carburetor via the air filter housing.

7. The invention recited in claim 1, further comprising means by which to cool the exhaust gases being supplied from the exhaust manifold to the carburetor by said exhaust return line.

8. The invention recited in claim 1, further comprising means by which to retain said vaporizer manifold between the carburetor, for receiving the supply of liquid fuel therefrom, and the intake manifold, for delivering the vaporized fuel thereto.

9. For an internal combustion engine including a carburetor and intake and exhaust manifolds, a vaporizer manifold and gas conveying system for receiving liquid fuel from the carburetor and converting the liquid fuel to a vapor to be supplied to the intake manifold to power the engine, said vaporizer manifold and gas conveying system comprising:
  a plurality of heating tubes;
  a plurality of heat conducting fins being arranged in thermal contact with said heating tubes and positioned to come into contact with the liquid fuel received from the carburetor;
  inlet line means extending between the exhaust manifold and said plurality of heating tubes for conveying some of the hot exhaust gases exiting the engine at said exhaust manifold to said heating tubes for heating said tubes and the heat conducting fins in thermal contact therewith, whereby the liquid fuel received from the carburetor and contacting said fins is vaporized;
  outlet line means extending between said plurality of heating tubes and the carburetor for returning the exhaust gases which pass through said tubes to the carburetor; and
  exhaust return line means extending between the exhaust manifold and the carburetor for conveying other hot gases exiting the engine and not conveyed by said inlet line means to the carburetor to be mixed with fresh air thereat.

10. The invention recited in claim 9, further comprising means by which to retain said vaporizer manifold between the carburetor and intake manifold of the engine so that liquid fuel is received from the carburetor and vaporized fuel is supplied to the intake manifold.

11. The invention recited in claim 9, wherein the engine also has an air filter housing communicating fluidically with the carburetor, said outlet line means comprising an exhaust outlet line that is connected from said plurality of heating tubes to said air filter housing so that the exhaust gases which pass through said tubes are supplied by said exhaust outline to the carburetor via the air filter housing.

12. A method for reducing the amount of pollutants that are emitted by an internal combustion engine of the type having a carburetor and intake and exhaust manifolds by vaporizing the liquid fuel that is provided by the carburetor for powering the engine, said method including the steps of:
  heating the liquid fuel provided by the carburetor and converting the liquid fuel to a vapor so that the fuel enters the intake manifold as a vapor;
  supplying some of the hot exhaust gases being emitted from the engine for heating and thereby vaporizing the liquid fuel provided by the carburetor;
  returning said exhaust gases to the carburetor after the liquid fuel has been heated and vaporized thereby; and
  recycling other exhaust gases that are emitted from the engine and not supplied for heating and vaporizing the liquid fuel provided by the carburetor by returning said other exhaust gases to the carburetor to be mixed with fresh air thereat.

13. The method recited in claim 12, including the additional steps of heating the liquid fuel in a vaporizer manifold comprising a plurality of heating tubes and a plurality of heat conducting fins in thermal contact with said heating tubes;
  passing some of the hot exhaust gases emitted from the engine through said heating tubes to heat said tubes and the heat conducting fins in thermal contact therewith;
  returning the exhaust gases exiting said heating tubes to the carburetor; and
  passing the liquid fuel from the carburetor over the heat conducting fins for converting the liquid fuel to a vapor.

14. The method recited in claim 13, including the additional step of connecting said vaporizer manifold between the carburetor, for receiving the liquid fuel therefrom, and the intake manifold, for supplying vaporized fuel thereto for powering the engine.

15. The method recited in claim 13, including the additional step of connecting an exhaust inlet line between the exhaust manifold of the engine and the heating tubes of said vaporizer manifold for supplying the hot exhaust gases from the exhaust manifold to said heating tubes.

16. The method recited in claim 13, wherein the engine also has an air filter housing located in fluid communication with the carburetor, said method including the additional step of connecting an exhaust outlet line between the heating tubes of said vaporizer manifold and said air filter housing for conveying the exhaust gases exiting said plurality of heating tubes to the carburetor by way of the air filter housing.

* * * * *